(Model.)

A. SAUNDERS.
REAMER.

No. 252,903. Patented Jan. 31, 1882.

Witnesses —
Thomas E. Crossman
Rob't W. Matthews

Inventor —
Andrew Saunders
per James A. Whitney
Att'y

UNITED STATES PATENT OFFICE.

ANDREW SAUNDERS, OF YONKERS, NEW YORK.

REAMER.

SPECIFICATION forming part of Letters Patent No. 252,903, dated January 31, 1882.

Application filed May 9, 1881. (Model.)

*To all whom it may concern:*

Be it known that I, ANDREW SAUNDERS, of Yonkers, in the county of Westchester and State of New York, have invented certain Improvements in Reamers, of which the following is a specification.

This invention applies to that class of implements which are used for "sizing," so termed, the holes in metallic castings and other metallic work incident to the manufacture of machinery, &c. As ordinarily constructed said implements have been formed with a series of longitudinal cutting-edges arranged around the circumference of the tool in such manner that the cutting-edges themselves form the bearings for the implement, and the hole, as sized or brought to the accurate or uniform diameter required, is dependent upon the exact and accurate position of what may be termed an "annular" or "circular" series of cutting-edges. From this it is manifest that after a short period of use the edges will become more or less worn away, and the available diameter of the implement will be reduced in the same proportion, so that great difficulty is experienced in bringing any suitable number of holes to a standard size or diameter. It is true that certain attempts have been made to render the annular or circular series of cutting-edges adjustable by forming the edges upon a series of keys sliding in inclined seats in the body of the implement, and capable of being driven inward from the outer or working end thereof in such manner as to afford an increased diameter in proportion as the edges become worn by use. In such devices, however, there has been experienced great difficulty in bringing the cutting-edges accurately to the desired position, and a greatly increased expense in the construction thereof; and the fact still remains that the bearing of the implement in the hole to be reamed out consists of the cutting-edges themselves, so that the implement, while performing this work, is unstable and liable to be more or less inaccurate and faulty in the work performed.

The object of my aforesaid invention is to obviate all this by providing a tool in which not only shall the cutting edge or edges be adjustable, but in which the bearing of the implement against the interior of the hole to be reamed (or undergoing the reaming operation) shall be upon a practically cylindric surface, thereby giving the desired stability and uniformity to the position and motion of the implement while in use.

To this end my invention comprises certain novel combinations of parts hereinafter more fully specified.

Figure 1:
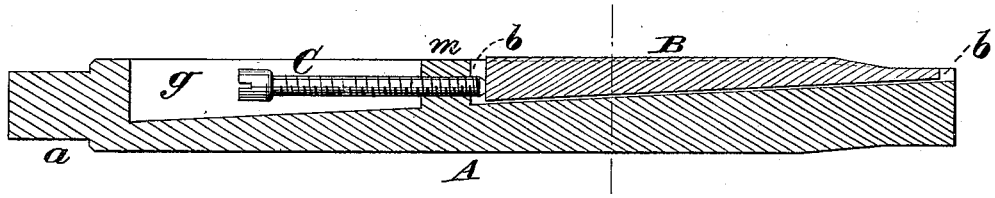
Figure 2:
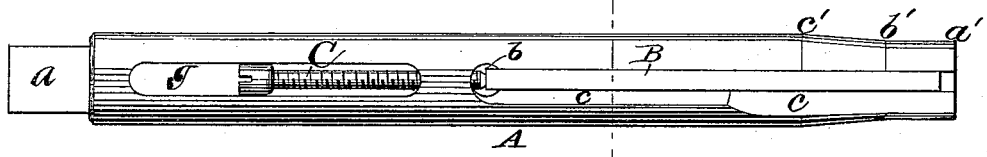
Figure 3:
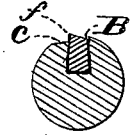

Figure 1 is a central longitudinal sectional view of a hand-reamer embracing my said invention. Fig. 2 is a side view thereof, and Fig. 3 is a transverse sectional view taken in the line *x x* of Figs. 1 and 2.

A is what may be termed the "body" of the implement, which is constructed at one end with a suitably-squared shank, *a*, to permit the attachment of the usual wrench for the purpose of giving the desired rotatory movement to the implement when in use, and at the opposite end is made of slightly diminished diameter for a short portion of its length, as shown at *a′ b′*, the stock being tapered from the inner end of this part *a′ b′* for a short distance, as shown at *a′ b′ c′*, as represented in Figs. 1 and 2. The degree of this taper is necessarily much exaggerated in the drawings, inasmuch as the same would not be clearly perceptible if represented in the actual proportions and dimensions of the tool as constructed for use and operation. The degree of inclination of the taper *a′ b′ c′* will be understood from the fact that the part *a′ b′* is of such diameter as to pass into the rough hole, while the part *c′*—that is to say, the main length of the body—is of the diameter of the finished or reamed-out hole. The actual difference between the diameter of the part *a′ b′* and the diameter of the main portion of the body is intended to be equal to the thickness of the "bore," so termed, left upon the inner surface of the rough hole by the action of the drill or boring-tool, and may be compared to the thickness of an ordinary sheet of paper. The part *a′ b′* therefore permits the entrance of the tool when the same is applied to its work, and secures its steadiness in passing inward to its said work, as hereinafter explained. It is also to be observed that the outer extremity of the key B, hereinafter described, is removed or cut away, so as not to interfere with the insertion of the parts *a′ b′* in the rough hole preparatory to reaming the latter.

The body A is preferably made of steel hardened, inasmuch as by being of steel the said body will be far less liable to become worn and diminished in size than if the metal of which it is composed were of softer character, and thereby subject in a greater degree to abrasion by its rotating contact with the interior of the holes to be reamed. Formed in one side of this body A is a longitudinal slot or seat, b, of dovetail form in its cross-section, as represented in Fig. 3, and having its bottom on an incline lowest at its inner end and highest at its outer end, as represented in Fig. 1. The body A, at one side of the seat b, is cut away, as represented at c in Figs. 2 and 3, the object being to afford clear scope for the action of the cutting-edge f, which is formed upon the longitudinally-adjustable key B, which is in cross-section of dovetail shape in order that it may be retained in the seat b, and its under side is inclined with reference to the upper side, so as to form a wedge with a slope opposite that of the bottom of the said seat b, in order that by moving the said key B outward or inward, as the case may be, this cutting-edge may be brought farther from or nearer to the axis of the body A, so that the cutting-edge f will be brought into exactly the desired relation with the cylindrical surface of the said body, so as to exert its cutting action in substantially the same circular path as that indicated by the circumference of the said body. Formed in the inner part of the body A is a longitudinal cavity, g, between which and the inner end of the seat b is a solid bearing or nut, m, through which works the adjusting-screw C in such manner that by turning said screw in the proper direction the key B may be pushed longitudinally outward to the degree necessary to bring the cutting-edge f into suitable relation with the cylindrical surface of the body A, so that by this means, when the edge f becomes worn away by the continued use of the implement, the key B may be moved outward to bring the said edge, when resharpened, into the same position as before with reference to the before-mentioned cylindrical surface of the body A, and thereby enable the implement, even after very long continued use, to ream out holes of the same diameter as those reamed and completed by the operation of the implement at the outset; and inasmuch as the body A has a diameter only very slightly inferior to that of the finished hole, and inasmuch as the edge f has but a very slight projection beyond the longitudinal lines of the cylindrical surface of the body A, it follows that the implement has a substantially cylindrical bearing extending nearly but not entirely around it, and is thereby rendered stable and firm in its operation to an extent unequaled by the implements hitherto devised for reaming.

It is to be observed that while the implement as represented in the drawings is more especially designed for use and operation by hand, yet the invention may be applied in the construction of reamers to be operated by power; and, furthermore, it is also to be observed that while in reamers of moderate size—as, for example, those less than two inches in diameter—one key B, with its cutting-edge f, is sufficient, yet in implements of a larger diameter two or more of the keys B, constructed with the cutting-edges f, as hereinbefore described, may be employed, it being of course necessary that for each of the said keys employed in the implement there should be the necessary seat b, cut away at one side, as represented at c.

I do not claim the implement having a semicircular or half-cylindrical shank, and shown in the English patent of Bodmer, No. 8,070, A. D. 1839; neither do I claim the implement having a substantially triangular cross-section, of which the salient points comprise two longitudinal shoulders or projections, together with the tangential projection of the edge of a knife or cutter, said implements being essentially different from my said invention and incapable of producing the improved results and approximately perfect work produced by and resulting from the peculiar construction and combinations of parts embraced by my said invention; but

What I claim as my invention is—

1. In a reaming-implement, the combination of the cylindrical body A, constructed with the cavity g and the seat b, the adjustable key B, having a cutting-edge, f, and an actuating-screw, C, arranged to adjust the key B, all substantially as and for the purpose herein set forth.

2. In a reaming-implement, the combination of the hardened steel body A, of cylindrical form, and constructed with a cavity, g, a seat, b, and key B, having a cutting-edge, f, and an actuating-screw, C, working through a solid nut or bearing, m, to adjust the key B, all substantially as and for the purpose herein set forth.

3. In a reaming-implement, the cylindrical body A, constructed with the parts a' b' of diminished diameter, and the tapered portions a' b' c', and having the inclined dovetailed seat b, the adjustable key B, having a cutting-edge, f, the aforesaid body being cut away at one side of the said key B, and the parts being constructed and combined substantially as and for the purpose herein set forth.

ANDREW SAUNDERS.

Witnesses:
WM. RILEY,
ALEX. SAUNDERS.